United States Patent [19]

Ettinger

[11] 4,137,445

[45] Jan. 30, 1979

[54] STUD RECEIVER

[75] Inventor: Donald H. Ettinger, Royal Oak, Mich.

[73] Assignee: USM Corporation, Farmington, Conn.

[21] Appl. No.: 839,396

[22] Filed: Oct. 4, 1977

[51] Int. Cl.² .............................................. B23K 9/20
[52] U.S. Cl. ................... 219/98; 219/78.01; 219/79; 219/99; 219/103
[58] Field of Search ............... 219/98, 99, 78.01, 79, 219/103

[56] References Cited

U.S. PATENT DOCUMENTS

| | | | |
|---|---|---|---|
| 3,487,190 | 12/1969 | Glorioso | 219/103 X |
| 3,498,878 | 1/1970 | Wieland | 219/103 X |
| 3,526,744 | 9/1970 | Ehrlich | 219/98 |
| 3,582,602 | 6/1971 | Ettinger | 219/98 |
| 3,597,572 | 8/1971 | Ettinger | 219/98 |
| 3,792,223 | 2/1974 | Spisak | 219/98 |
| 3,940,588 | 2/1976 | Ochry | 219/98 |
| 4,027,136 | 5/1977 | Taylor | 219/98 |

*Primary Examiner*—Richard R. Kucia
*Attorney, Agent, or Firm*—Aubrey C. Brine; Richard B. Megley; Vincent A. White

[57] ABSTRACT

A stud welding gun having means for automatically feeding studs to the barrel of the gun is provided with a stud receiver which facilitates removal of jammed studs from the device.

8 Claims, 8 Drawing Figures

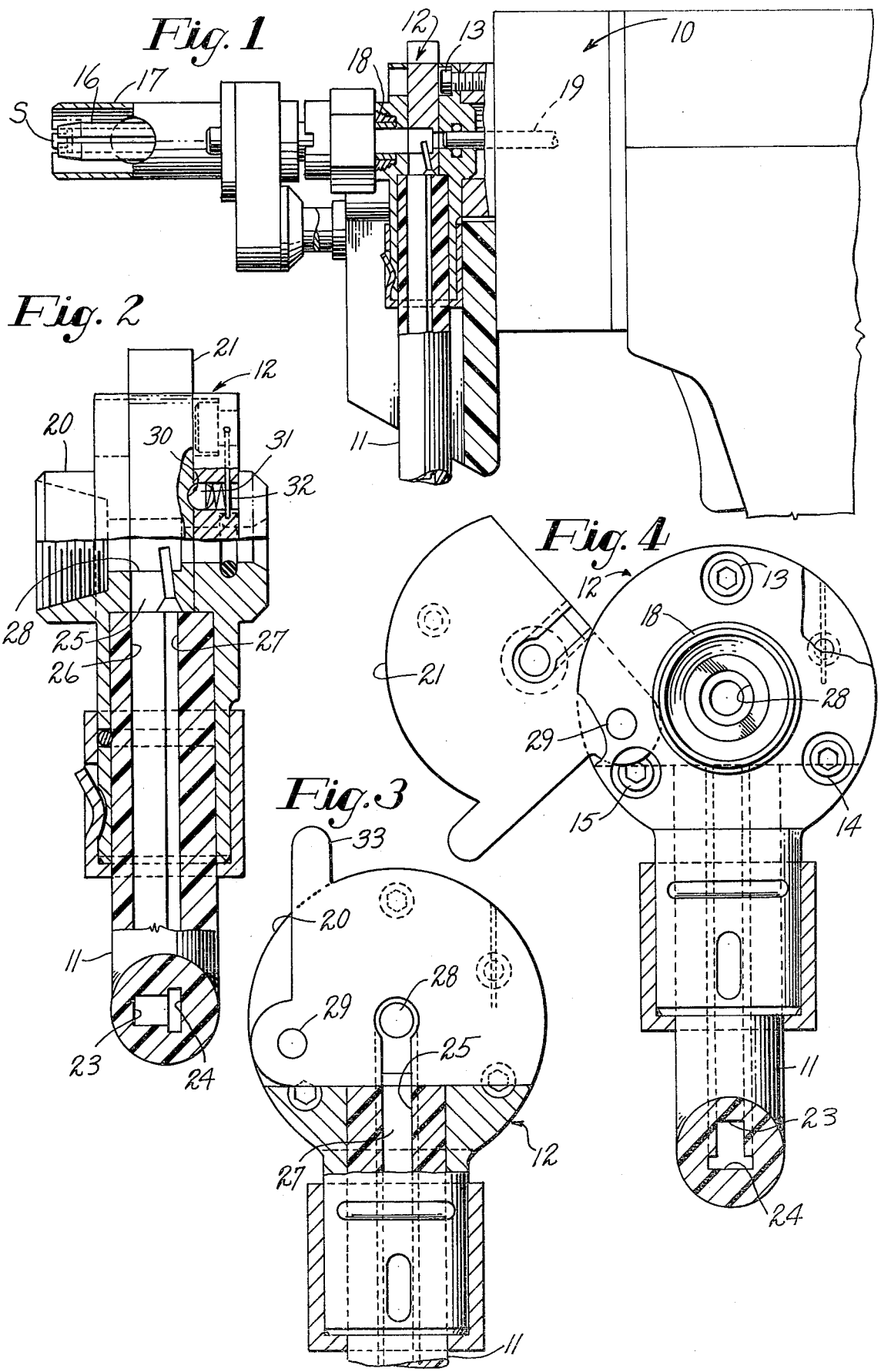

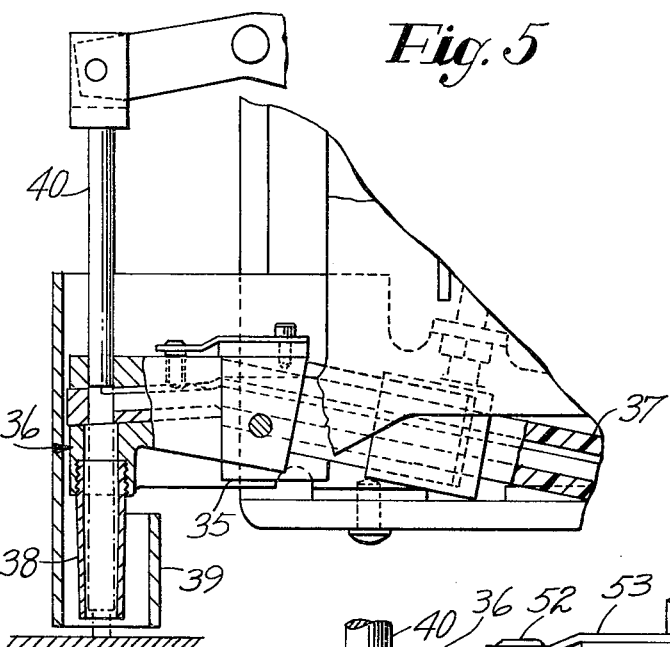
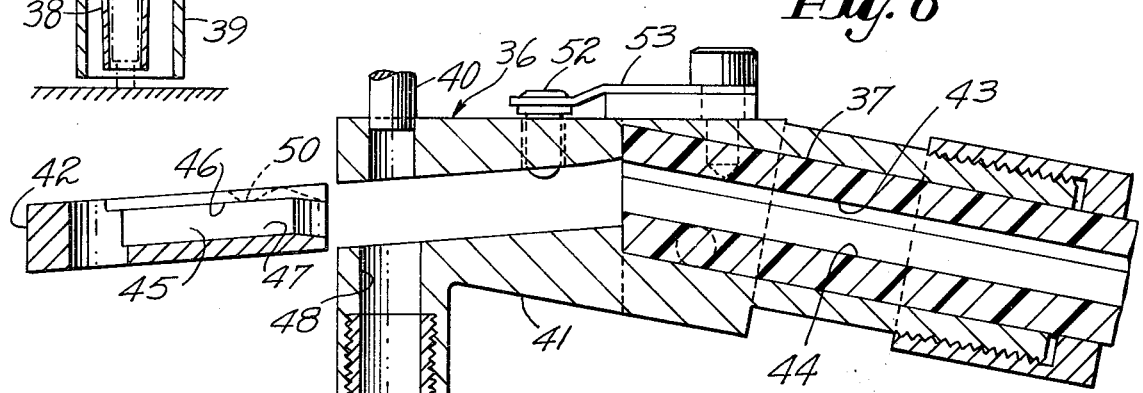
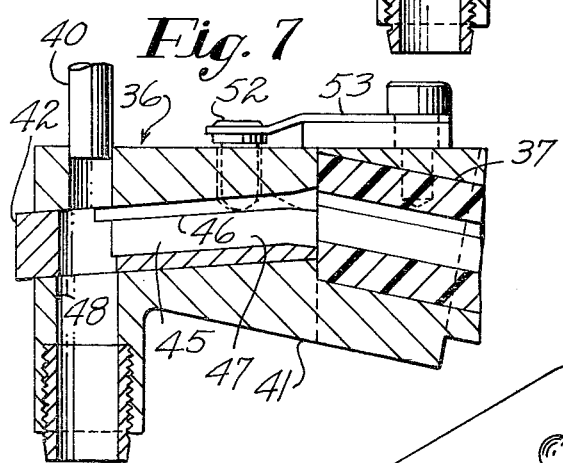
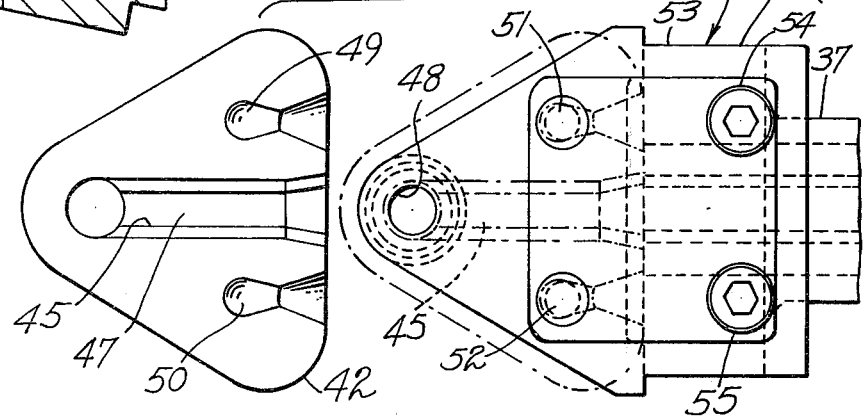

STUD RECEIVER

BACKGROUND OF THE INVENTION

The present invention relates to automatic stud welding equipment wherein a headed stud is fed to a retaining collet on the gun, and more particularly to a stud receiver for a gun of this type which facilitates removal of jammed studs from the device.

Various stud welding devices are known in which headed studs, commonly T-studs, are fed by pneumatic pressure to a collet or stud holding device which retains the stud for welding. Devices of this type are disclosed in United States Patent 3,582,602 in the name of Donald H. Ettinger and assigned to the assignee of the present invention, and in copending United States patent application entitled "Stud Welding Tool" filed in the name of Donald H. Ettinger, Ser. No. 839 397, on Oct. 4, 1977. In devices of this type, as a rule there is provided a metallic rod which is aligned with the stud collet and serves to force the stud into the collet and apply a force to the head of the stud during the welding operation.

For this reason, the stud must generally be fed into the conduit leading to the collet from a path which intersects the axis of the collet or stud retaining means. It is therefore been found advantageous to feed the stud in a direction normal to the axis of the stud along a path which terminates in the circular bore leading to the stud receiving collet. It is generally at this point that jamming in the device will occur, if at all, due to the change in direction of the stud from a path perpendicular to its axis to a path normal to its axis. When this occurs, it is generally necessary that the gun be taken out of service and a new one substituted for it, as the gun generally must be disassembled with appropriate tools in order to unjam the feedpath of the stud.

It is therefore an object of the present invention to provide a stud welding gun having means for automatically feeding studs to the barrel of the gun which includes a stud receiver block facilitating removal of jammed studs from the device.

Another object of the invention is to provide a device for welding headed studs to a work surface having an automatic stud feeding arrangement wherein a stud receiving block is provided with a readily removable portion for removing jammed studs from the gun.

A further object of the invention is to provide a device of the type described wherein the studs which become jammed adjacent the welding head are readily removed without the use of tools and without extensive delay in use of the gun for continued service.

SUMMARY OF THE INVENTION

The above objects are achieved by the present invention which provides in a welding device a two-part receiver block having a cylindrical bore formed therein through which a stud is fed axially to a collet. A second bore is formed in the block and intersects the cylindrical bore. The second bore is formed with an internal cross-section substantially T-shaped to receive a stud fed therethrough in a direction normal to the stud axis. The stud receiver block comprises a first fixed part which maintains the cylindrical bore in alignment with the collet and the second part movable relative to the first part, the second part of the block comprising that portion of the cylindrical bore which intersects with the T-shaped bore. Studs which become jammed during operation of the device at the intersection of the two bores are removed from the device upon movement of the second part of the receiver block relative to the fixed part, which movable part may be readily removed from the first part of the block.

The movable second part of the receiver block may be either pivotally attached to the block fixed part, or may be completely removable from the fixed part, and retained by detents or other means.

BRIEF DESCRIPTION OF THE DRAWING

For a clear understanding of the invention reference should be made to the following description of the preferred embodiments taken in conjunction with the accompanying drawing, wherein:

FIG. 1 is a fragmentary side elevational view, partially in section showing a portion of a stud welding device having the invention embodied therein;

FIG. 2 is a side elevational view partially in section, showing details of a portion of the structure of FIG. 1 taken on an enlarged scale for clarity;

FIG. 3 is a front elevational view partly in section, showing further details of the structure of FIG. 2;

FIG. 4 is a front elevational view partly in section, similar to FIG. 3 showing details of the elements of the device during a phase of its operation;

FIG. 5 is a fragmentary side elevational view, partially in section showing a portion of a different stud welding device than that of FIG. 1, having an alternate embodiment of the invention embodied therein;

FIG. 6 is a side elevational view partially in section showing details of a portion of the structure of FIG. 5 taken on an enlarged scale for clarity;

FIG. 7 is a side elevational view partially in section similar to FIG. 6 showing details of the elements during a phase of operation of the device; and FIG. 8 is a top plan view showing the structure of FIG. 6 in greater detail.

DESCRIPTION OF A PREFERRED EMBODIMENT

Referring to FIGS. 1 through 4, there is shown a welding device 10 wherein the studs are fed to the device through a stud feeding conduit 11. The conduit 11 is attached to a stud receiver block 12, which is shown in detail in FIGS. 2, 3 and 4, and shown incorporated into the device 10 in FIG. 1.

The receiver block 12 is fastened to the device 10 by three threaded fasteners 13, 14 and 15 which are received in the head of the device 10 and that portion of the device comprising a stud retaining collet 16 and flash shield 17 is threadedly received in a boss 18 formed on the reciver block 12. The arrangment further comprises an electrode rod 19 which is employed during the operation of the device 10 to effect feeding to a headed stud from the receiver block 12 to the collet 16 by movement of the rod from the position shown, to a position adjacent the end of the collet.

The various elements of the device 10 excluding the receiver block 12 which is the subject of the present invention, are similar to those disclosed in U.S. Pat. No. 3,582,602 assigned to the assignee of the present invention. These elements, as well as the operational features of the device will not be explained in detail here, as they may be understood by review of the aforementioned patent, and are not considered to be part of the present invention.

The type of stud S as shown in the collet 16 is a type generally known in the art as a T-stud, and is particularly used in automobile construction for the attachment of trim, and other components.

Referring now to FIGS. 2, 3 and 4, the receiver block 12 is shown to comprise a portion 20, fixed relative to the device 10, and a portion 21, movable relative to the collet or other elements of the device. As best shown in FIGS. 2 and 4, the conduit 11 is of flexible material and has an internal bore substantially in the shape of a T to conform to the elevational outline of a T-stud fastener. The bore 22 is bounded in part by a lower surface 23 which forms the bottom of the leg portion of the T, and an upper surface 24 which defines the cross portion of the T, in the T-shaped bore 22.

The bore 22 terminates at the block 12 and is generally aligned with a T-shaped bore 25 formed in the block. The bore 25 comprises a lower surface 26 forming the bottom of the leg of the T, and an upper surface 27 which forms the upper cross portion of the T defined by the T-shaped bore 25.

The T-shaped bore 25 intersects a circular bore extending through the block 12. The bore 28 is so located that with the receiver block 12 mounted in the device 10, its axis is aligned with the collet 16 and the rod 19, as shown in FIG. 1.

As will be noted, the receiver block 12 is so constructed that that portion of the T-shaped bore located in the block 12 is formed at least in part in the movable portion 21 of the block. In the present embodiment, the entire T-shaped bore 25 is formed in the block portion 21 with the exception of the lower surface 26. The lower surface 26 is formed in the fixed portion 20 of the block 12.

The movable portion 21 of the block 12 is pivotally retained by a pin 29 such that transition of the movable portion 21 may occur from a position shown in FIG. 3 to the position shown in FIG. 4. When located in the position shown in FIG. 3, the movable portion 21 is retained by means of a spherical indentation 30 formed in the portion 21 mating with a ball 31 and spring 32 assembled to form a ball detent assembly.

In operation, T-studs S are fed in a direction transverse to their axis through the conduit 11 by compressed air, as is well known in the art. The studs S enter the block 12 and are carried to the intersection of the bore 25 and the circular bore 28 by the force of the compressed air. At this point in the operation, the rod 19 is forced through the circular bore 28 and moves the stud S axially to a point where it is firmly gripped by the end of the collet 16.

During this operation, should a jam occur as the stud S is in the process of changing its direction of feed, the jam will be located in the block 12. To remove the jammed stud, the operator merely grips a tab 33 located on the block portion 21 and pivots the movable portion to the position shown in FIG. 4. The stud may be readily removed from the intersecting bores 25 or 28 by access through the leg portion of the T-shaped bore 25, or the bore 28, depending on the location of the stud.

With the stud removed, the operator merely pivots the movable portion 21 back to its location as shown in FIG. 3 and the device 10 is ready for operation, without extensive delay, or shutdown of the device.

Referring now to FIGS. 5 through 8, an alternate embodiment of the invention is shown to be employed in a welding device 35. The device 35 comprises a receiver block 36 which is rigidly mounted between a pair of movable arms of the device, and to which T-shaped studs are delivered by means of a flexible conduit 37.

A stud retaining collet 38 is threadedly received in the block 36 and a flash shield 39 partially surrounds the collet 38. A cylindrical rod 30 is movable from the position shown in FIG. 5 to a position where the rod end is adjacent the outer end of the collet 38 to move a stud S to a position in gripping engagement with the end of the collet.

The structure shown, is explained in greater detail, and other elements forming the device 35 are disclosed in Applicant's copendiing U.S. patent application Ser. No. 839,397, filed Oct. 4, 1977 and assigned to the assignee of the present invention. The remaining portions of the device 35, not shown herein, have been omitted as they are not considered necessary for an understanding of the present invention and form no part of the present invention.

Referring now to FIGS. 6 through 8, it will be observed that the receiving block 36 comprises a stationary or fixed portion 41 and a movable portion 42, relative to the collet 38.

As with the previous embodiment, the flexible conduit 37 has an inner surface formed in the profile of a T-shaped headed stud, the upper surface 43 defining the cross portion of the T-shaped conduit and a lower surface 44 defining the bottom of the leg of the T.

The conduit 37 terminates at a T-shaped bore 45 formed in the block 36. The T-shaped bore 35 is aligned with the inner surface of the conduit 37 and is partially defined by an upper surface 46 forming the top of the cross portion of the T, and a lower surface 47 forming the bottom of the leg of the T.

The T-shaped bore 45 intersects a circular bore 48 leading to the collet 38.

Referring particularly to FIG. 7, the movable portion 42 of the block 36 is provided with a pair of spherical cavities 49 and 50 which are aligned with a pair of openings leading to the exterior surface of the block 36. A pair of detent pins 51 and 52 are located with their spherical ends extending through the openings in the block 36 and are spring biased into the cavities 49 and 50 by virtue of a spring plate 53. The spring plate 53 is attached to the block 36 by means of cap screws 54 and 55 inserted through a spacer block 56, and received into the block 36.

As in the previous embodiment, in operation a T-shaped stud is fed in a direction perpendicular to its axis through the conduit 37 and into the T-shaped bore 35 of the receiver block 36 by a source of compressed air. At the intersection of the T-shaped bore 35 with the circular bore 48, the rod 40 is actuated to mechanically plunge the fastener to a position where the head is retained at the end of the collet 38, which is so dimensioned as to grip the head of the T-stud.

Should a jam occur in the device at or near the intersection of the T-shaped bore 35 with circular bore 38, the operator may remove the jammed T-stud by removing the portion 42 of the block 36, which allows the operator access to that portion of the T-stud path where the jam has likely occurred.

It will be evident that in the embodiment under discussion, the upper surface 46 of the T-shaped bore 45 is formed by the fixed portion 41 of the block 36 while the remainder of the T-shaped bore is formed in the removable portion 42 of the block. This assures that access to the area which would be involved in the jam is available to the operator when the portion 42 is separated from the portion 41.

Upon removal of the jammed fastener, the removable portion 42 is merely inserted into the slot provided for it in the fixed portion 41 and moved to a point where the detent pins 51 and 52 contact the cavities 49 and 50 to retain the portions 41 and 42 in proper alignment.

It should be evident from the above that a jammed T-stud is effectively removed by the operator, without the need for special tools and without unnecessary shutdown of the device for an extended length of time.

Having thus described my invention, what I claim as new and desire to secure by Letters Patent of the United States is:

1. In a device for arc welding headed studs to a work surface wherein the studs are fed seriatim to a stud retaining collet, the combination of a two part receiver block having a cylindrical bore formed therein through which a stud is fed axially to said collet,
a second bore formed in said block and intersecting said cylindrical bore, said second bore being formed with an internal cross section substantially T-shaped to receive a stud fed therethrough in a direction normal to the stud axis,
said receiver block comprising a fixed part which maintains said cylindrical bore in alignment with said collet and a second part movable relative to said first part, said second part of said receiver block comprising that portion of cylindrical bore which intersects with T-shaped bore whereby headed studs which become jammed during operation at the bore intersections are readily removed from the device.

2. A device as set forth in claim 1 wherein said block second part is pivotally attached to said block fixed part.

3. A device as set forth in claim 1 wherein said block second part is retained on said block fixed part by detent means.

4. A device as set forth in claim 1 wherein said portion of said T-shaped bore adjacent its intersection with said cylindrical bore comprises an upper wall formed by said fixed part of said receiver block and the remaining walls of said T-shaped bore formed by said second part of said receiver block.

5. A device as set forth in claim 4 wherein said block second part is pivotally attached to said block fixed part.

6. A device as set forth in claim 4 wherein said block second part is on said block fixed part by detent means.

7. A device as set forth in claim 6 wherein said block fixed part has a slot formed therein into which said block second part is received, an opening formed through said block fixed part from an outer surface thereof into said groove, said detent means comprising a spring biased pin having a spherical end extending into said groove and a spherical cavity formed in a surface of said block second part in alignment with said pin.

8. A device as set forth in claim 7 wherein said opposite end of said pin from said spherical end of said pin is attached to a resilient plate and the resilient plate is attached to said outer surface of said fixed block part whereby said resilient plate provides a spring biasing force of said spherical pen end into said spherical cavity.

* * * * *

UNITED STATES PATENT OFFICE
CERTIFICATE OF CORRECTION

Patent No. 4,137,445　　　　　　　Dated January 30, 1979

Inventor(s) Donald H. Ettinger

It is certified that error appears in the above-identified patent and that said Letters Patent are hereby corrected as shown below:

Column 5, Cl. 1, Line 27, after "portion of" add, "said"

Signed and Sealed this

Eighth Day of May 1979

[SEAL]

Attest:

RUTH C. MASON
Attesting Officer

DONALD W. BANNER
Commissioner of Patents and Trademarks